United States Patent [19]

Balzer

[11] 4,182,426
[45] Jan. 8, 1980

[54] TRACTOR UNIT FOR IMPLEMENTS AND VEHICLES

[76] Inventor: Abram P. Balzer, Box 191, Mountain Lake, Minn. 56159

[21] Appl. No.: 873,416

[22] Filed: Jan. 30, 1978

[51] Int. Cl.$^2$ .......................... B62D 7/06; B60D 1/00; B60D 1/10
[52] U.S. Cl. .......................... 180/12; 280/93; 280/508
[58] Field of Search .............. 180/11, 12, 13; 280/93, 280/95 R, 504, 508, 514

[56] References Cited

U.S. PATENT DOCUMENTS

| | | | |
|---|---|---|---|
| 2,421,867 | 6/1947 | Bizjak | 180/12 |
| 2,478,736 | 8/1949 | Balzer | 280/508 X |
| 2,578,897 | 12/1951 | Oliver | 244/50 |
| 2,644,540 | 7/1953 | Balzer | 180/26 |
| 2,844,390 | 7/1958 | Smith | 280/508 X |
| 2,848,252 | 8/1958 | Martin | 280/415 |
| 2,913,063 | 11/1959 | Brown | 280/93 X |
| 3,478,833 | 11/1969 | Breon et al. | 180/12 |
| 3,563,329 | 2/1971 | Licari | 180/12 |
| 3,692,134 | 9/1972 | Shepherd et al. | 180/12 |
| 3,825,089 | 7/1974 | Murphy | 180/12 |
| 3,854,542 | 12/1974 | Jesswein et al. | 180/12 |
| 3,874,469 | 4/1975 | Sjovall | 180/12 |
| 3,876,023 | 4/1975 | Hushower et al. | 180/14 R |
| 3,917,305 | 11/1975 | DiChirico | 280/93 |

*Primary Examiner*—Albert J. Makay
*Assistant Examiner*—Edmond G. Rishell, Jr.
*Attorney, Agent, or Firm*—Merchant, Gould, Smith, Edell, Welter & Schmidt

[57] ABSTRACT

A tractor unit for wheeled vehicles having fixed draft tongues, the tractor unit including a frame supported at its front end by a pair of laterally spaced steerable drive wheels, and having a supporting leg at its rear end movable between an operative frame supporting position and an inoperative raised position. A support arm extends rearwardly from the frame and is disposed to underlie and support the draft tongue of a vehicle. A locking pin releasably locks the draft tongue to the support arm. The support wheels have generally vertically extending pivot shafts and a generally vertical steering shaft is rotatably carried by the frame intermediate the pivot shafts on a fixed axis. Power transmission mechanism operatively connects the steering shaft with the pivot shafts, and is responsive to rotation of one of the pivot shafts in either direction of steering movement away from a neutral position to rotate the other pivot shaft in the same direction but to a different angular extent.

10 Claims, 10 Drawing Figures

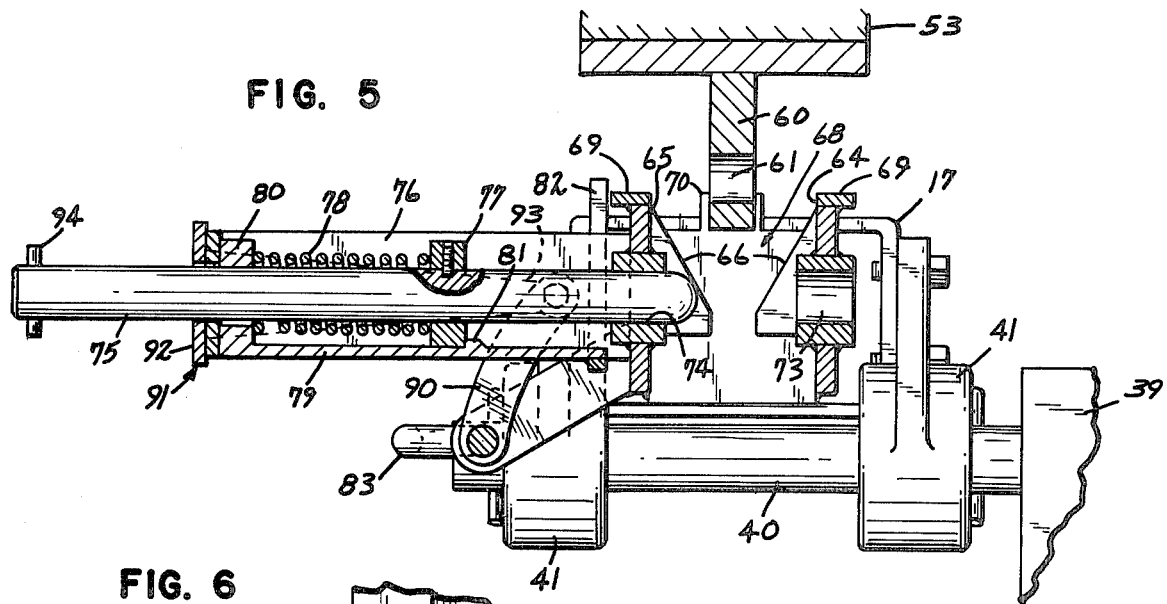
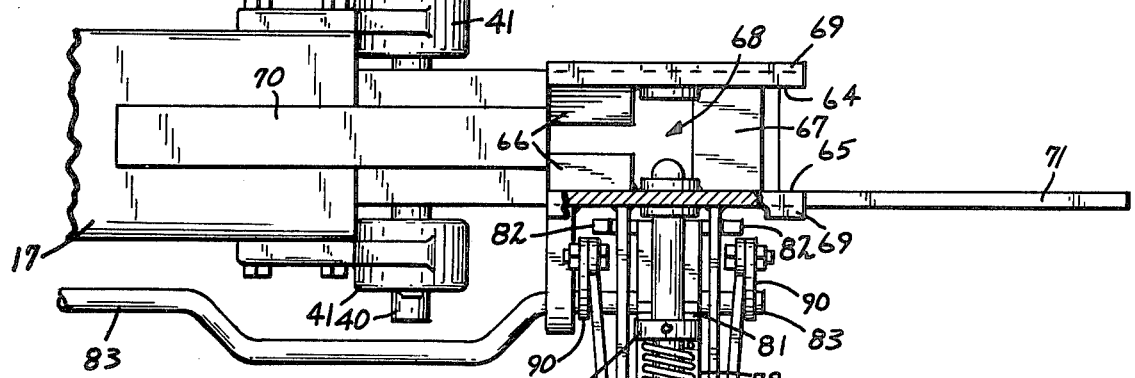
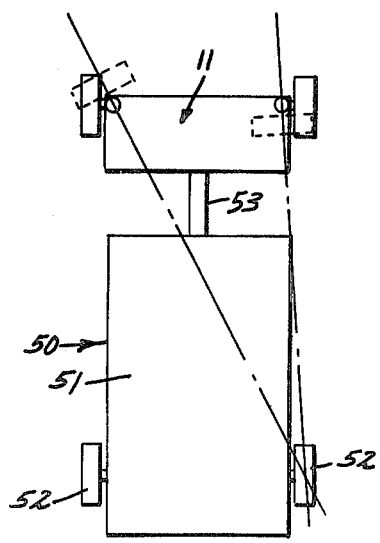
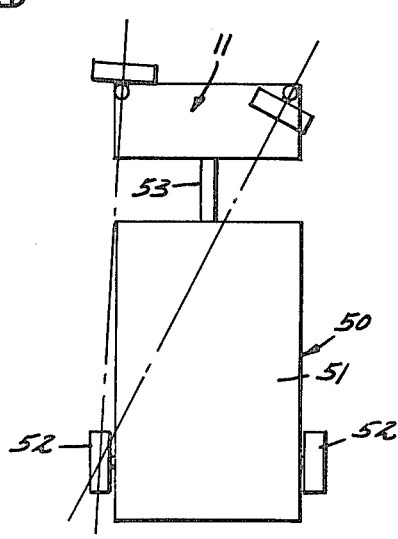

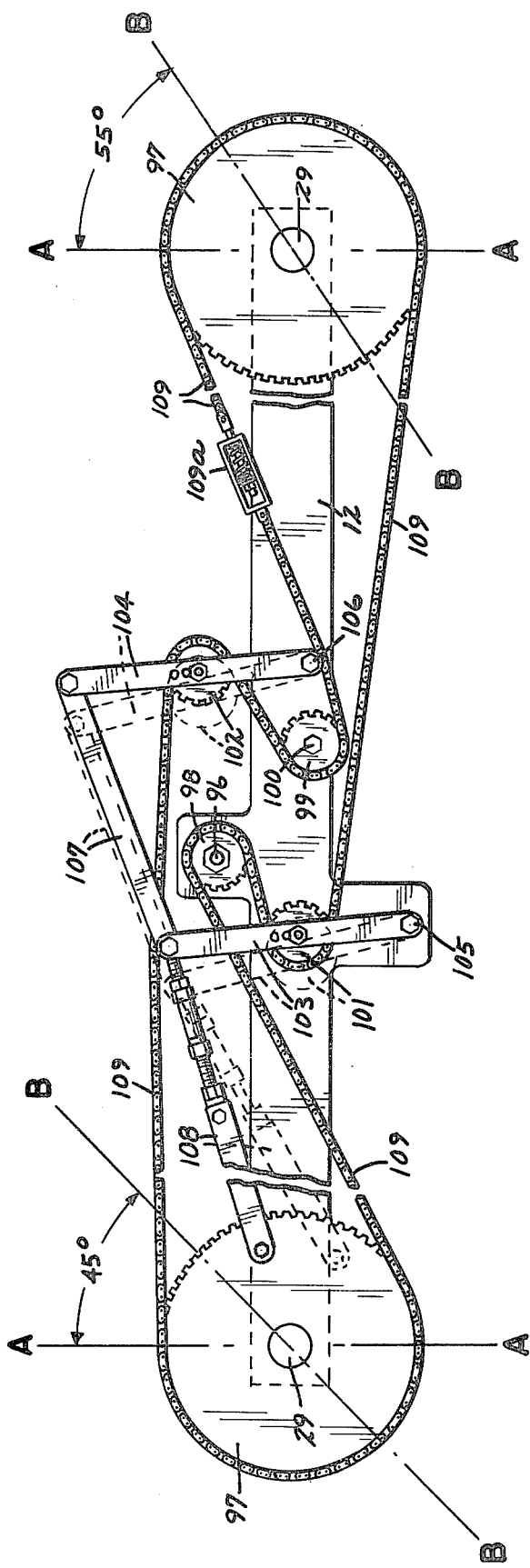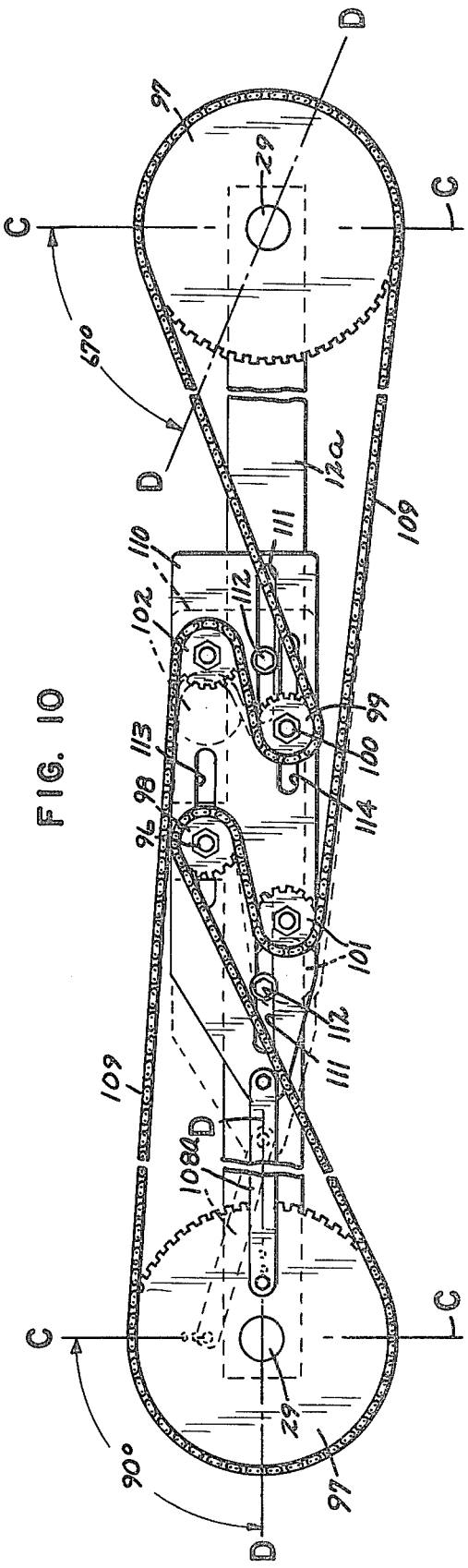

TRACTOR UNIT FOR IMPLEMENTS AND VEHICLES

BACKGROUND OF THE INVENTION

This invention relates generally to tractors for towing agricultural vehicles or implements, and more particularly to two-wheeled tractors which, when attached to vehicles, partially support the vehicles and which in turn are partially supported by the vehicles.

SUMMARY OF THE INVENTION

An object of this invention is the provision of a tractor which may be rigidly coupled to the front end of a vehicle having supporting wheels at its rear end, so that the tractor and vehicle operate as an integrated unit.

Another object of this invention is the provision of a tractor as set forth, having a novel steering arrangement which eliminates the scrubbing action of wheels on the ground during steering movement.

Another object of this invention is the provision of a tractor as set forth, and a vehicle having cooperating interconnecting mechanism by means of which the tractor and vehicle are mutually supported.

A tractor unit is provided, comprising, a frame having opposite side portions and front and rear ends, a pair of laterally spaced steerable wheels, means mounting said wheels at said opposite side portions and at one and of said frame for rotation on generally horizontal axes and for steering movements on generally vertical axes, and including generally vertical pivot shafts one for each of said wheels. Means are provided for supporting the other end of said frame, as are hitch means at one of the ends of said frame for hitching said frame to a vehicle. Means for imparting steering movements to said wheels comprises: a rotary fixed shaft operatively carried by said frame on a fixed axis, toothed wheels on each of said pivot shafts, a pair of primary toothed wheels one operatively rotatably carried by said frame on a fixed axis intermediate said pivot shafts, the other one of said primary toothed wheels being fixed on said steering shaft for rotation therewith. Shiftable means is provided, journaling a pair of secondary toothed wheels on axes spaced apart in a direction transversely of said frame and movable with each other in directions generally transversely of said frame. An endless flexible power transmission member is entrained over all of said toothed wheels, and shifting means is responsive to rotation of one of said toothed wheels for imparting shifting movements to said shiftable means whereby to rotate one of said pivot shafts to a greater angular extent than the other thereof in a given direction of pivotal movement of said pivot shafts.

BRIEF DESCRIPTION OF THE DRAWINGS

FIG. 5 is an enlargd fragmentary section taken on the line 5—5 of FIG. 1;

FIG. 6 is an enlarged fragmentary view in top plan of a portion of FIG. 1, some parts being broken away and some parts being shown in section;

FIGS. 7 and 8 are diagrammatic views in top plan showing the tractor of this invention coupled to a wheeled vehicle, and illustrating different positions of the steerable driving wheels of the tractor and the relationship thereof to the wheels of the towed vehicle;

FIG. 9 is an enlarged diagrammatic view in top plan of the steering mechanism of the tractor; and FIG. 10 is a view corresponding to FIG. 9 but showing a modified arrangement.

DETAILED DESCRIPTION OF THE PREFERRED EMBODIMENT

Figure 1:
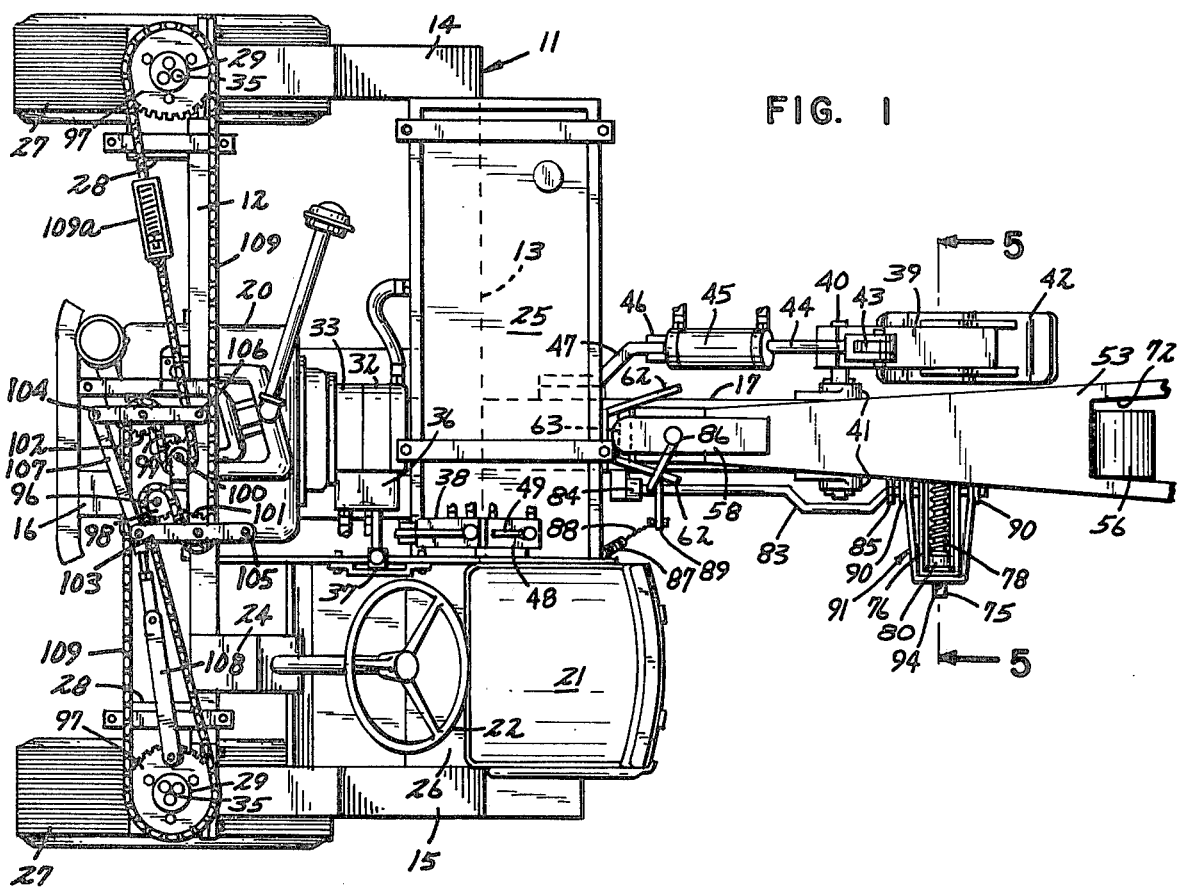
FIG. 1 is a view in top plan of the tractor of this invention, attached to the draft tongue of a vehicle, fragmentarily shown.
Figure 2:
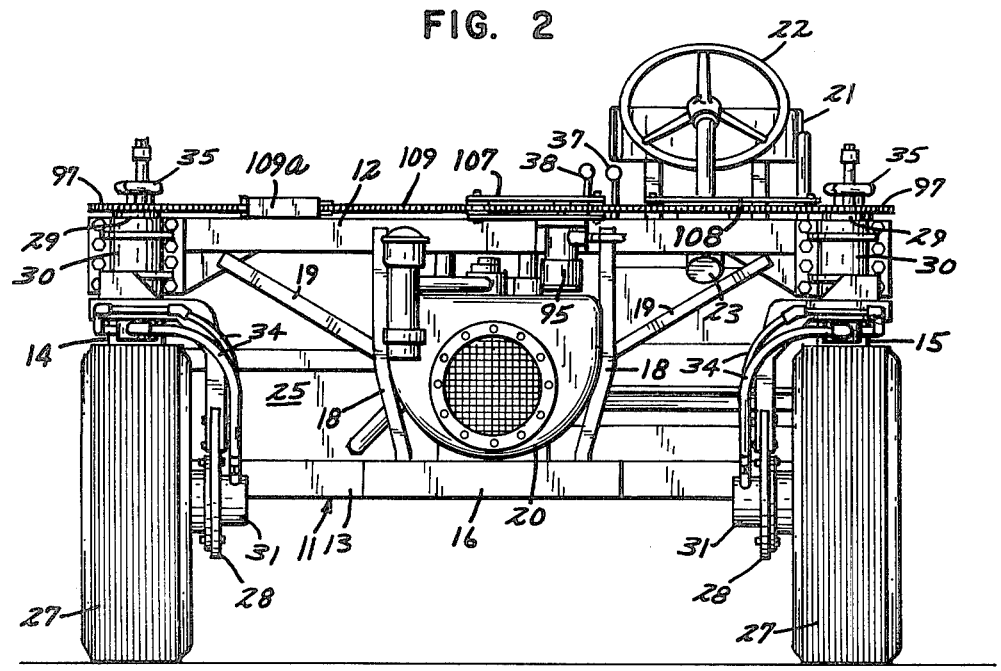
FIG. 2 is a view in front end elevation, as seen from the left to the right with respect to FIG. 1.

The tractor of this invention involves a generally rectangular frame 11 comprising an upper transverse front frame member 12, a lower rear transverse frame member 13, a pair of opposit side frame members 14 and 15, a motor support 16, and hitch means in the nature of an elongated support arm element 17 extending rearwardly from the rear frame member 13 generally centrally between the opposite ends thereof. At its front end, the frame 11 is braced by laterally spaced brace members 18 welded or otherwise rigidly secured at their opposite ends to the upper front frame member 12 and motor support 16, and angular brace members 19 rigidly secured at their opposite ends to the brace members 18 and gusset portions of the frame member 12.

A motor 20 preferably in the nature of an internal combustion engine is mounted on the motor support 16, a conventional driver's seat 21 is suitably mounted on the rear frame member 13 adjacent the side frame member 15, a steering wheel 22 is disposed forwardly of the operator's seat 21 and is operatively connected to a conventional power steering control valve 23 mounted in a bracket 24 that is secured to the front frame member 12. The rear frame member 13 further supports a fluid reservoir 25 as well as a fuel tank 26, below the operator's seat 21, for the engine 20.

The front end of the frame 11 is supported by a pair of laterally spaced steerable pneumatic tire equipped wheels 27 that are journaled on generally horizontal axes in the lower ends of pivot frames 28 which at their upper ends are provided with normally vertically extending pivot shafts 29 that are journaled in bearings 30 rigidly secured to opposite ends of the upper front frame member 12. At their lower ends, the pivot frames 28 are provided with rotary fluid operated motors 31 which may be assumed to be operatively connected to respective ones of the drive wheels 27 for imparting rotation thereto. Fluid under pressure is supplied to the motors 31 from a fluid pump 32 which, together with another fluid pump 33, is operated by the motor 20. Fluid conduits 34 and 35 operatively connect the motors 31 to the pump 32. It may be assumed that the conduits 34 are connected to respective conduits 35 by fluid passages, not shown, but extending axially through the pivot shafts 29. Flow of fluid under pressure to the motors 31 is controlled by a suitable reversing valve 36 operated by a control handle 37, and a conventional speed control valve 38.

The tractor frame 11 is adapted to be supported at its rear end by a leg 39 that is mounted on a shaf 40 journaled in bearings 41 rigidly secured to the sunport arm element 17. At its lower end, the leg 39 has pivotally connected thereto a skid-like foot 42 that is adapted to engage the ground. At its upper end, the leg 39 is formed to provide an angularly displaced lever arm 43 the outer end of which is pivotally secured to the outer end of a piston rod 44 that is provided with a piston, not shown, but axiallly slidable within a fluid pressure cylinder 45. One end of the cylinder 45 is pivotally secured, as indicated at 46, to a bracket 47 that is welded or otherwise rigidly secured to one side of the support arm element 17, see particularly FIGS. 1 and 4. While not specifically shown, the cylinder 45 may be assumed to be operatively connected to the fluid pump 33 and controlled by a valve 48 disposed adjacent the operator's seat 21 and operated by a handle 49. By manipulating of the valve operating handle 49, the leg 39 may be caused to swing upwardly or downwardly, as shown in FIGS. 3 and 4 whereby to raise or lower the rear end of the tractor.

Figure 3:
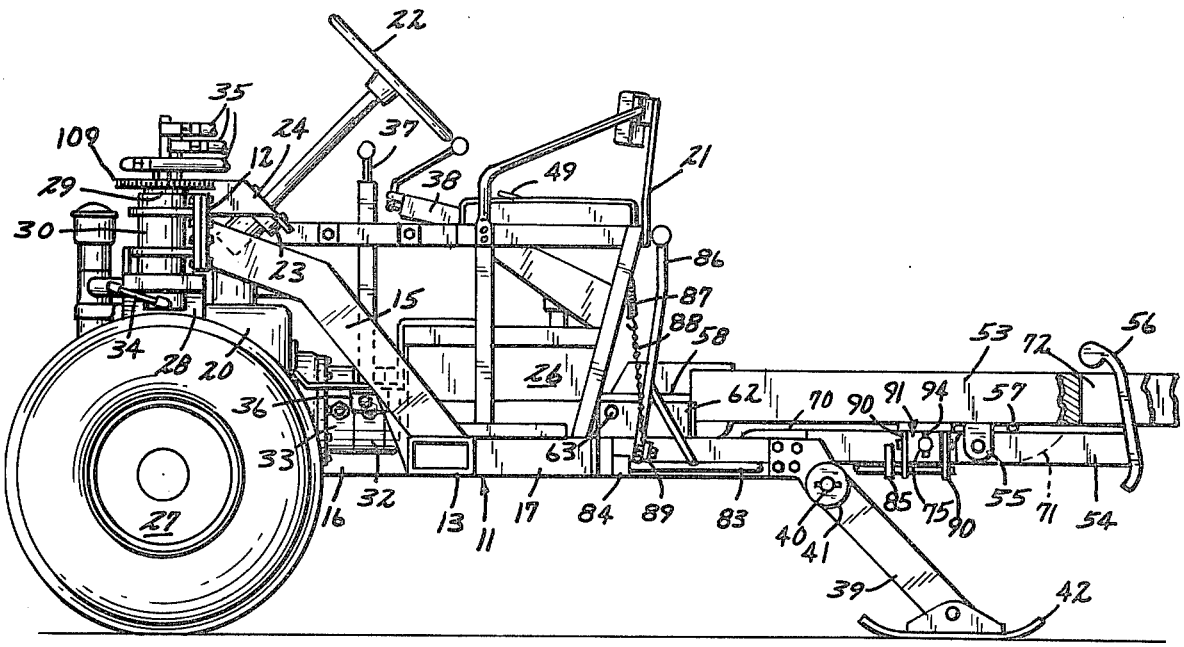
FIG. 3 is a fragmentary view in side elevation as seen from the right to the left of FIG. 2.

In FIGS. 7 and 8, and fragmentarily in FIGS. 1 and 3, the tractor is shown as being operatively coupled to a vehicle indicated generally at 50. The vehicle 50 is shown diagrammatically in FIGS. 7 and 8 as being in the nature of a wagon having a body 51 that is supported near its rear end by a pair of laterally spaced wheels 52, and a draft tongue 53 rigid with the body 51 and projecting forwardly from the front end thereof. The front end of the vehicle 50, when disassociated from the tractor, is supported by a bifurcated leg 54 that is pivotally connected at its upper end to a bracket 55 depending from the draft tongue 53. At its lower end, the bifurcated leg 54 is provided with a ground engaging skid-like shoe 56. Intermediate its ends, the leg 54 is provided with a laterally extending finger or shaft 57, the purpose of which will hereinafter become apparent. At its front end, the draft tongue 53 is provided with vertically spaced upper and lower guide portions 58 and 59 respectively, and a rigid locking lug 60 depends from the draft tongue 53 in forwardly spaced relation to the bracket 55, the locking lug 60 having a transverse opening 61 therethrough.

Figure 4:
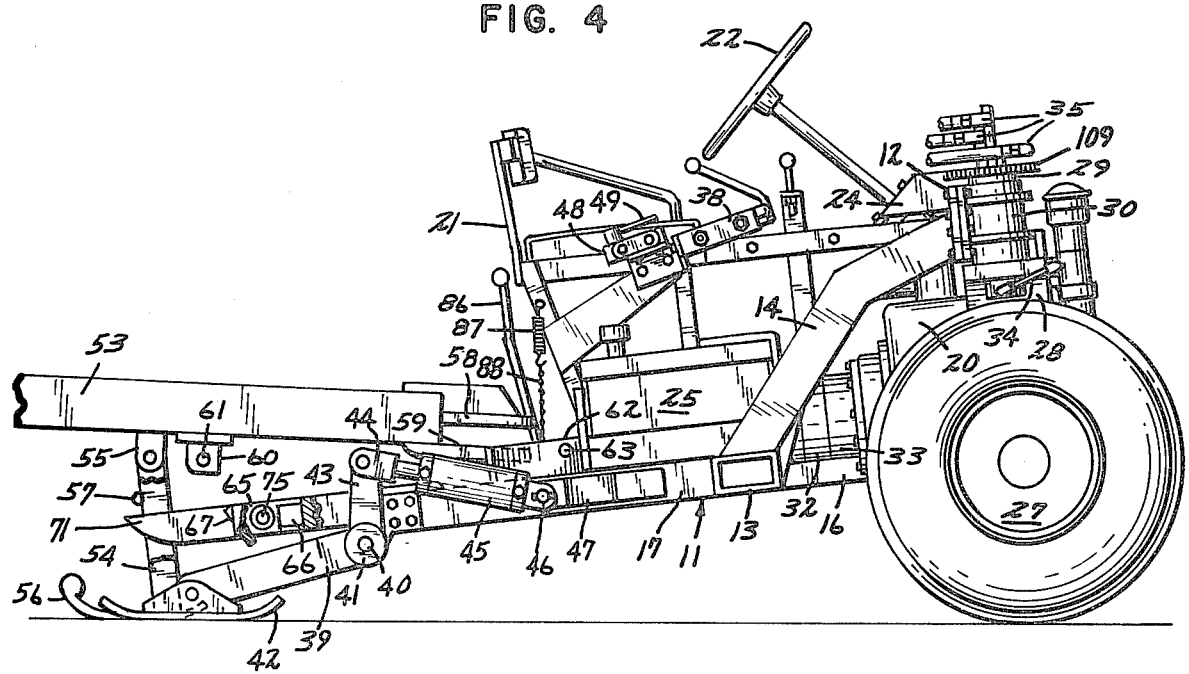
FIG. 4 is a fragmentary view in side elevation as seen from the left to the right with respect to FIG. 2, and showing the tractor partially disconnected from the draft tongue of a vehicle.

As shown particularly in FIGS. 1, 3 and 4, the support arm element 17 is adapted to be moved into underlying engagement with the draft tongue 53 and forwardly of its rear end is provided with a pair of rearwardly diverging guide walls 62 that are adapted to receive the lower guide portion 59 of the draft tongue 53, the upper guide portion 58 being adapted to rest on the upper edges of the guide walls 62, as shown in FIG. 3. A retaining pin 63 extends transversely between the guide walls 62 and is disposed between the guide portions 58 and 59 when the draft tongue 53 is fully engaged by the support arm elements 17, as shown in FIG. 3, to limit relative vertical movement between the front end of the draft tongue 53 and the adjacent portion of the support arm element 17. At its rear end, the support arm element 17 is bifurcated to provide a pair of laterally spaced side walls 64 and 65 having downwardly converging longitudinally extended guide portions 66 adjacent their front ends, and connected adjacent their rear ends by a forwardly and downwardly sloping rear wall 67, the side walls 64 and 65, guide portions 66 and rear wall 67 cooperating to define an upwardly opening socket 68 for reception of the locking lug 60. The upper edge portions of the side walls 64 and 65 are provided with wear strips 69 that engage the bottom surface of the draft tongue 53, as does a wear strip 70 on the top surface of the support arm element 17 forwardly of the socket 68.

As shown in FIG. 4, when it is desired to couple the tractor to the vehicle 50, the leg 39 is moved so as to lower the support arm element 17 below the level of the draft tongue 53. The tractor is then moved rearwardly and into underlying alignment with the draft tongue 53 so that the guide portions 58 and 59 operatively engage the guide walls 62 of the support arm element 17. The rear end of the support arm element 17 is provided with a rearwardly extending blade-like finger 71 that moves into underlying relationship to the stud or shaft 57 on the leg 54. And, as the leg 39 is moved to raise the rear end portion of the tractor and the support arm element 17, the finger 71 engages the shaft 57 and moves the leg 54 into an inoperative storage position as shown in FIG. 3. When the vehicle supporting leg 54 is thus raised, the shoe 56 thereof is disposed within an opening 72 in the draft tongue 53. During raising of the support arm element 17, the guide portions 66 and rear wall 67 guide the locking lug 60 into a predetermined position in the socket 68.

The side walls 64 and 65 are formed with bosses that define aligned transverse openings 73 and 74 respectively that are aligned with the opening 61 in the locking lug 60 when the locking lug 60 is contained in the socket 68. An elongated locking pin 75 has an inner end portion that is axially slidable in the opening 74 toward and away from reception in the aligned opening 73. Laterally outwardly of the support arm element 17, the locking pin 75 is slidably supported by the base portion of a U-shaped support member 76, the legs of which are welded or otherwise rigidly secured to the side wall 65. Intermediate its ends, the locking pin 75 has a collar 77 rigidly secured thereto, the collar abuttingly engaging one end of a coil compression spring 78. An elongated latch member 79 is disposed generally within the U-shaped support member 76 and has an inturned outer end 80 that loosely encompasses the locking pin 75 in abutting engagement with the base end of the U-shaped support member 76, see FIGS. 5 and 6. It will be noted that the spring 78 has its outer end in abutting engagement with the inturned end 80 of the latch member 79, to yieldingly urge the locking pin 75 toward reception in the locking lug opening 61 and the opposite side wall opening 73. Intermediate its ends, the latch member 79 is formed to provide a collar engaging catch member or hook 81, and at its inner end is provided with a pair of laterally spaced release members 82 that extend upwardly on either side of the support member 76 for engagement with the bottom surface of the draft tongue element 53 when the locking lug 60 is moved downardly into the socket 68 and the opening 61 in the locking lug 60 is aligned with the openings 73 and 74. When the openings 61, 73 and 74 are thus aligned, the locking pin 75 is released for movement into the openings 61 and 73 to securely lock the support arm element 17 and draft tongue element 53 in operatively coupled engagement when the support arm element 17 and draft tongue elment 53 are thus coupled together, the valve 48 is manipulated to introduce fluid under pressure to the cylinder 45 in a direction to raise the leg 39 so as to disengage the foot 42 from the ground.

When it is desired to uncouple the support arm element from the draft tongue element 53, the valve 48 is manipulated to cause the cylinder 45 to operate in a manner to lower the leg 39 to its supporting position shown in FIG. 3.

Lever means for withdrawing the locking pin 75 from engagement with the locking lug 60, and for resetting the locking pin 75 in operative engagement with the catch member or hook 81, comprises an elongated resetting shaft 83 that is journaled in aligned bearings 84 and 85 at one side of the support arm element 17. An operating handle 86 extends upwardly from the front end portion of the resetting shaft 83 adjacent the operator's seat 21. The shaft 83 is yieldingly urged in one direction of its rotary movement by a coil tension spring 87 connected at one end to the operator's seat 21 and at its other end to a flexible member in the nature of a chain 88 that is connected to a crank arm 89 at the lower end of the handle 86. At its opposite or rear end, the resetting shaft 83 has rigidly secured thereto a pair of crank arms 90. A U-shaped resetting yoke 91 has a base portion 92 that encompasses the locking pin 75 outwardly of the support member 76, and a pair of spaced legs 93 that are pivotally connected at their ends each to a different one of the crank arms 90. The spring 87 yieldingly urges the shaft 83 in a direction to move the resetting yoke 91 into engagement of the base portion 92 thereof with the outer closed end of the U-shaped support member 76, as shown in FIGS. 5 and 6. An abutment pin 94 is mounted in the outer end portion of the locking pin 75, and is adapted to be engaged by the base portion 92 of the resetting yoke 91 to move the locking pin 75 to its latched inoperative position shown in FIGS. 5 and 6, responsive to operator imparted movement of the resetting handle 86 in a given direction. When the operator releases the handle 86 after having reset the locking pin 75 in its latched position, the spring 87 automatically rotates the resetting shaft 83 to move the yoke 91 to its position shown in FIGS. 5 and 6. It will be appreciated that the handle 86 must be manually held in its locking pin resetting position until the support arm element 17 is lowered sufficiently to cause disengagement between the draft tongue element 53 and the release members 82, so that the catch member or hook 81 will operatively engage the collar 77 on the locking pin 75. Thereafter, upon forward movement of the tractor, the leg 54 will be permittd to drop to its operative vehicle supporting position shown in FIG. 4, under the action of gravity.

For the purpose of imparting steering movements to the steerable drive wheels 27, I provide a rotary fluid pressure operated steering motor 95 that is mounted on the upper front frame member 12, and which has a rotary steering shaft 96 disposed on a fixed generally vertical axis and extending upwardly from the steering motor 95. While not specifically shown, the steering motor 95 may be assumed to be driven from one of the fluid pumps 32 or 33 and controlled by the power steering valve 23 in the usual manner. Each of the pivot shafts 29 has fixedly mounted thereon a different one of a pair of sprocket wheels 97. A pair of primary sprocket wheels 98 and 99 are disposed intermediate the sprocket wheels 97, the sprocket wheel 98 being fixed on the steering shaft 96, the sprocket wheel 99 being an idler wheel and journaled on a pivot bolt or shaft 100 extending upwardly from the frame member 12 on a fixed axis.

A pair of secondary sprocket wheels 101 and 102 are each journaled on the intermediate portion of a different one of a pair of respective levers 103 and 104 that have inner ends pivotally connected to the frame member 12 as indicated at 105 and 106 respectively. The outer ends of the levers 103 and 104 are pivotally connected each to an opposite end of a rigid link 107, and operatively connected to one of the sprocket wheels 97 by a longitudinally adjustable pitman arm 108. An endless link chain 109 is entrained over all of the sprocket wheels 97-99, 101 and 102. The arrangement is such that the sprocket wheels 101 and 102 will rotate in the same directions as the sprocket wheels 97, whereas the primary sprocket wheels 98 and 99 will rotate in directions opposite the directions of rotation of the sprocket wheels 97, 101 and 102.

With reference particularly to the diagrammatic showing in FIG. 9, it will be noted that the levers 103 and 104 are of equal length, and that the axes of rotation of the secondary sprocket wheels 101 and 102 are equidistant from the axes of the pivotal connections 105 and 106 of their respective levers 103 and 104. The full line positions of the levers 103 and 104, link 107 and pitman arm 108, in FIG. 9, are the positions assumed when the wheels 27 are in true forward or rearward driving positions, indicated by the broken lines A—A. In this position of the front wheels, the pivotal connection of the pitman arm 108 to the lefthand sprocket wheel 97 is disposed in substantially dead center relationship between the axis of the lefthand sprocket wheel 97 or pivot shaft 29 and the pivotal connection between the pitman arm 108 and the outer end of the lever 103. As steering movement is imparted to the pivot shafts 29 in either direction away from a straightforward or reverse direction as indicated by the lines A—A, movement of the levers 103 and 104 will cause one of the pivot shafts 29 to rotate to a further extent than the other thereof. As shown by full and broken lines in FIG. 9, when turning the pivot shafts 29 in a clockwise direction, so as to cause the tractor to steer to the right, the righthand pivot shaft 29 will rotate to a greater angular extent than the lefthand steering shaft 29, as indicated by the broken lines B—B in FIG. 9. As therein shown, when the lefthand pivot shaft 29 is rotated 45° of circular arc, the righthand pivot shaft 29 will rotate approximately 55° of circular arc. In practice, this has been found to occur whether the pivot shafts 29 are rotated in a clockwise direction as shown in FIG. 9, or in a counterclockwise direction wherein the lefthand pivot shaft 29 will rotate to a greater angular extent than the righthand pivot shaft 29. When the tractor is coupled to a given vehicle 50, as shown in FIGS. 7 and 8, and the tractor wheels 27 are steered in a clockwise direction to a given extent as shown by dotted lines in FIG. 7, the wheels 27 may be made to steer about an axis substantially coincident with the vertical center line of one of the vehicle wheels 52, such as the righthand wheel 52. In this situation, the lefthand wheel 52 will also swing generally forwardly about the same axis. When the wheels 27 are swung further, as shown in FIG. 8, the wheels will swing about a common axis substantially coincident with a vertical center line of the lefthand wheel 52, in which condition the righthand wheel 52 will swing generally rearwardly about the same axis. In any case, all of the wheels 27 and 52 will partake of steering movements without skidding or scrubbing of any of the wheels, the wheels 27 in any steering position on either side of a straightforward or reverse position will steer about a common axis. It will be noted, with reference to FIGS. 1 and 9, that the link chain 109 is provided with a conventional spring biased coupling member or link 109a for maintaining the chain at a predetermined driving tension.

Modification of FIG. 10

In the arrangement illustrated in FIG. 10, the sprocket wheels 97 are fixed on pivot shafts 29 that are journaled in a frame member 12a that differs only slightly in structure from the frame member 12. A plate-like carriage 110 is provided with a pair of elongated slots 111 for reception of mounting bolts 112 by means of which the carriage 110 is mounted on the frame member 12a for linear sliding movements between the sprocket wheels 97. The carriage 110 is provided with other slots 113 and 114 through which extend the steering shaft 96 and the pivot bolt 100 respectively on which respective ones of the primary sprocket wheels 98 and 99 are mounted as in FIG. 9. The secondary sprocket wheels 101 and 102 are mounted on the carriage 110 for rotation with respect thereto and for common movements therewith. The carriage 110 is connected to one of the sprocket wheels 97 by a pitman arm 108a by means of which the carriage 110 is moved responsive to rotation of the respective sprocket wheel 97 in either direction from a neutral or straightforward position of the tractor wheels, as indicated by the center lines C—C.

The carriage 110 operates to provide a differential in rotation between the pivot shafts 29, in either direction from a neutral position, in the same manner as do the levers 103 and 104. As shown in FIG. 10, when the pivot shafts 29 are rotated in a counterclockwise direction, a 90° rotation of the lefthand pivot shaft 29 will result in approximately 67° of rotation of the righthand pivot shaft in the same direction, as indicated by the center lines D—D in FIG. 10. As is the case with the structure of FIG. 9, when the pivot shafts 29 of the structure in FIG. 10 are rotated in a clockwise direction from a neutral position of the tractor wheels, the righthand pivot shaft 29 will rotate to a greater extent than does the lefthand pivot shaft 29.

While I have shown and described a preferred embodiment and a single modified arrangement of this invention, it will be understood that the same is capable of further modification without departure from the spirit and scope of the invention, as defined in the claims.

What is claimed is:
1. A tractor unit comprising:
   (a) a frame having opposite side portions and front and rear ends;
   (b) a pair of laterally spaced steerable wheels;
   (c) means mounting said wheels at said opposite side portions and at one end of said frame for rotation on generally horizontal axes and for steering movements on generally vertical axes, and including generally vertical pivot shafts, one for each of said wheels;
   (d) means for supporting the other end of said frame;
   (e) hitch means at one of the ends of said frame for hitching said frame to a vehicle;
   (f) and means for imparting steering movements to said wheels, comprising:
      (i) a rotary steering shaft operatively carried by said frame on a fixed axis;
      (ii) toothed wheels on each of said pivot shafts;
      (iii) a pair of primary toothed wheels one operatively rotatably carried by said frame on a fixed axis intermediate said pivot shafts, the other one of said primary toothed wheels being fixed on said steering shaft for rotation therewith;
      (iv) a pair of secondary toothed wheels;
      (v) shiftable means journaling said secondary toothed wheels about axes spaced apart in a direction transversely of said frame and movable with each other in directions generally transversely of said frame;
      (vi) an endless flexible power transmission member entrained over all of said toothed wheels;
      (vii) and shifting means comprising a pitman arm having one end pivotally connected to one of said pivot shaft mounted toothed wheels and an opposite end operatively connected to said shiftable means and responsive to rotation of said toothed wheels for imparting shifting movements to said shiftable means to rotate one of said pivot shafts to a greater angular extent than the other thereof in a given direction of pivotal movement of said pivot shafts.

2. The tractor unit defined in claim 1 in which said toothed wheels are sprocket wheels, said power transmission member comprising a link chain.

3. The tractor unit defined in claim 2 in which said link chain is disposed relative to said sprocket wheels to impart rotation to said pivot shaft mounted toothed wheels in the same direction as one of said pairs of toothed wheels and in a direction opposite that of the other pair thereof.

4. The tractor unit defined in claim 3 in which said link chain is disposed to impart rotation to said pivot shaft mounted toothed wheels in the same direction as said secondary toothed wheels and in the direction opposite that of said primary toothed wheels.

5. The tractor unit defined in claim 1 in which said shiftable means comprises a pair of levers having inner ends pivotally mounted on said frame and each carrying a different one of said secondary toothed wheels, and link means connecting the outer ends of said levers for common pivotal movement on said frame.

6. The tractor unit defined in claim 1 in which said shiftable means comprises a carriage mounted and guided on said frame for linear movements in a path intersecting the axes of said pivot shafts, said pitman arm having said other end thereof pivotally connected to said support member.

7. The tractor unit defined in claim 1 in which said steerable wheels are drive wheels, further comprising drive means including an engine on said frame for imparting driving rotation to said steerable wheels.

8. The tractor unit defined in claim 1 in which said hitch means comprises an elongated support arm element extending rearwardly of said tractor frame and having a front end portion defining rearwardly diverging guide walls for a vehicle draft tongue and a rear end portion defining a socket for reception of a portion of said vehicle draft tongue, and a locking pin mounted for movements into and out of said socket in directions transversely of said support arm element.

9. In combination with a vehicle having supporting wheels at its rear end and a fixed forwardly and rearwardly extending draft tongue at its front end, a tractor unit comprising:
   (a) a frame having opposite side portions and front and rear ends;
   (b) a pair of laterally spaced steerable drive wheels;
   (c) means mounting said drive wheels at said opposite side portions and at the front end of said frame for rotation on generally horizontal axes and for steering movements on generally vertical axes, and including generally vertical pivot shafts, one for each of said wheels;
   (d) generally vertically movable means for supporting the rear end of said frame;

(e) means for imparting driving rotation to said steerable drive wheels;
(f) means for imparting steering movements to said steerable drive wheels;
(g) and hitch means on said tractor including an elongated support arm extending rearwardly of said tractor frame and disposed to underlie and support said draft tongue;
(h) said hitch means including a pair of rearwardly diverging draft tongue engaging guide walls overlying the front end portion of said support arm;
(i) said draft tongue having a locking lug projecting downwardly therefrom;
(j) said support arm defining an upwardly opening socket for reception of said locking lug and having a transverse opening extending to said socket;
(k) a locking pin mounted in said transverse opening in said support arm for movements transversely through said socket and into the transverse opening in said locking lug to releasably lock said support arm in supporting and towing relationship to said draft tongue;
yielding means urging said locking pin toward said opening in said locking lug;
(m) a catch member engaging said locking pin to hold the locking pin away from reception in said locking lug opening;
(n) a catch release member engaging said draft tongue responsive to movement of said locking lug into said socket to release said locking pin for yielding means imparted movement thereof into said opening;
(o) and means for imparting unlocking movement to said locking pin.

10. The combination defined in claim 9 in which said means for imparting unlocking movements to said locking pin includes lever means pivotally mounted on said hitch means for withdrawing said locking pin from engagement with said lug and for moving said locking pin into operative engagement with said catch member against bias of said yielding means.

* * * * *